United States Patent [19]

Ogoe et al.

[11] Patent Number: 5,258,432
[45] Date of Patent: Nov. 2, 1993

[54] IGNITION RESISTANT POLYCARBONATE BLENDS

[75] Inventors: Samuel A. Ogoe, Missouri City; Michael K. Laughner, Lake Jackson; Jack W. Muskopf, Lake Jackson; Jeffrey E. Lackey, Lake Jackson, all of Tex.

[73] Assignee: The Dow Chemical Company, Midland, Mich.

[21] Appl. No.: 850,323

[22] Filed: Mar. 10, 1992

[51] Int. Cl.⁵ .................... C08K 5/49; C08K 5/523; C08L 69/00
[52] U.S. Cl. .................... 524/141; 524/133; 524/147; 524/154; 525/67; 525/133; 525/146; 525/147; 525/148
[58] Field of Search ............ 524/133, 141, 147, 154; 525/67, 133, 146, 147, 148

[56] References Cited

U.S. PATENT DOCUMENTS

| | | |
|---|---|---|
| 3,915,926 | 10/1975 | Wambach . |
| 3,936,400 | 2/1976 | Wambach . |
| 4,044,073 | 8/1977 | Baron et al. . |
| 4,344,878 | 8/1982 | Dolce ................ 525/439 |
| 4,454,275 | 6/1984 | Rosenquist ........... 524/164 |
| 4,555,540 | 11/1985 | Avakian .............. 524/130 |
| 4,636,544 | 1/1987 | Hepp ................. 524/411 |
| 4,656,227 | 4/1987 | Lindner et al. ....... 525/133 |
| 4,900,784 | 2/1990 | Tabankia et al. ...... 525/67 |
| 4,927,870 | 5/1990 | Ogoe et al. .......... 524/141 |
| 4,966,935 | 10/1990 | Takahashi ............ 524/412 |
| 5,030,675 | 7/1991 | Wittmann ............. 524/141 |

FOREIGN PATENT DOCUMENTS

| | | |
|---|---|---|
| 229957 | 7/1987 | European Pat. Off. . |
| 4040243 | 9/1991 | Fed. Rep. of Germany ...... 524/141 |
| 01350 | 2/1991 | PCT Int'l Appl. ............ 524/141 |

*Primary Examiner*—David J. Buttner

[57] ABSTRACT

A blended composition containing polycarbonate and polyester and/or an acrylate polymer, modified with poly(tetrafluoroethylene), an organophosphorous compound and an aromatic halogenated carbonate oligomer to obtain ignition resistance properties, and, optionally, an elastomeric impact modifier.

16 Claims, No Drawings

IGNITION RESISTANT POLYCARBONATE BLENDS

FIELD OF THE INVENTION

This invention relates to ignition resistant blends of polycarbonate and polyester and/or an acrylate polymer.

BACKGROUND OF THE INVENTION

Although many flame and ignition retardants for thermoplastics are known, it has been found to be preferred, in a blend of polycarbonate and polyester and/or an acrylate polymer, to avoid the use of flame retardants which could cause transesterification of the polycarbonate and polyester, or could otherwise cause degradation of the polycarbonate composition.

SUMMARY OF THE INVENTION

In one aspect, this invention involves a composition of matter containing, in admixture, polycarbonate, polyester, fibril-forming poly(tetrafluoroethylene), an organophosphorous compound, and an aromatic halogenated carbonate oligomer. In another aspect, this invention involves a composition of matter containing, in admixture, polycarbonate, an acrylate polymer, fibril-forming poly(tetrafluoroethylene), an organophosphorous compound, and an aromatic halogenated carbonate oligomer.

It has been found that the compositions of this invention exhibit desirable levels of ignition resistance.

The compositions of this invention are useful, for example, in the production of films, fibers, extruded sheets, multi-layer laminates and molded or shaped articles of virtually all varieties, especially appliance and instrument housings, motor vehicle body panels and other parts and components for use in the automotive, electrical and electronics industries. The methods of this invention are useful for preparing compositions and molded articles having applications which are the same as or similar to the foregoing.

DETAILED DESCRIPTION OF THE INVENTION

The compositions of this invention are those in which (a) a blend of (i) polycarbonate and (ii) polyester and/or (iii) an acrylate polymer has been admixed in a composition with (b) (i) an organophosphorous compound, (ii) fibril-forming poly(tetrafluoroethylene), and (iii) a halogenated aromatic carbonate oligomer. The compositions of this invention may, optionally, contain (c) an elastomeric impact modifier. Suitable ranges of content for components (a)–(c) in the compositions of this invention, expressed in parts by weight of the total composition, are as follows:

(a) (i) polycarbonate from about 5 parts to about 95 parts, and preferably from about 25 parts to about 80 parts,
(a) (ii) polyester up to about 80 parts, preferably from about 10 parts to about 70 parts, and more preferably from about 20 parts to about 70 parts,
(a) (iii) acrylate polymer up to about 80 parts, preferably from about 10 parts to about 70 parts, and more preferably from about 20 parts to about 70 parts.
(b) (i) organophosphorous compound from about 0.001 part to about 20 parts, preferably from about 0.1 part to about 10 parts, and more preferably from about 0.1 part to about 5 parts,
(b) (ii) fibril-forming poly(tetrafluoroethylene) from about 0.001 part to about 20 parts, preferably from about 0.01 part to about 10 parts, and more preferably from about 0.1 part to about 5 parts,
(b) (iii) halogenated aromatic carbonate oligomer from about 0.001 part to about 50 parts, preferably from about 0.1 part to about 30 parts, and more preferably from about 0.1 part to about 20 parts,
(c) elastomeric impact modifier up to about 30 parts, preferably from about 1 to about 20 parts, and preferably from about 1 to about 15 parts.

Preparation of the compositions of this invention can be accomplished by any suitable mixing means known in the art. Typically the substances to be admixed with the polycarbonate/polyester blend are dry blended in particulate form with sufficient agitation to obtain thorough distribution thereof. If desired, the dry-blended formulation can further be melt mixed, for example in an extruder with or without a vacuum, or otherwise compounded with additional substances. Apparatus which can be used in the blending process include, for example, mixing rolls, a dough-mixer or a Banbury mixer.

When softened or melted by the application of heat, the compositions of this invention can undergo fabrication and can therein be formed or molded using conventional techniques such as compression, injection molding, gas assisted injection molding, calendering, vacuum forming, thermoforming, extrusion and/or blow molding techniques, alone or in combination. The compositions can also be formed, spun or drawn into films, fibers, multilayer laminates or extruded sheets, or can be compounded with one or more organic or inorganic substances, on any machine suitable for such purpose.

Articles molded from compositions prepared within the ranges of content stated above exhibit a desirably high level of ignition resistance. When the composition contains the optional elastomeric impact modifier, desirably high levels of impact resistance are also obtained.

In a preferred embodiment, the compositions of this invention do not include an inorganic salt, particularly not an acidic or basic salt. Representative examples of salts which would, in such preferred embodiment, not be included in a composition of this invention are those formed from an alkali metal or alkaline earth metal and a counterion containing nitrogen, sulfur, phosphorous and/or oxygen. Specific examples of such salts are antimony oxide, $Na_2SO_4$, $K_2SO_4$ and $NaHSO_4$. Salts such as the aforementioned could cause degradation and/or transesterfication of the polycarbonate and polyester resins, and their presence therefore may not be desirable in the compositions of this invention.

Component (a) (i) in the compositions of this invention is a polycarbonate, which can be prepared from a dihydroxy compound such as a bisphenol, and a carbonate precursor such as a disubstituted carbonic acid derivative, a haloformate (such as a bishaloformate of a glycol or dihydroxy benzene) or a carbonate ester. These components are often reacted by means of the phase boundary process in which the dihydroxy compound is dissolved and deprotonated in an aqueous alkaline solution and the carbonate precursor is dissolved in an organic solvent. The aqueous alkaline solution has a pH of 7.01 or more and can be formed in water from a caustic soda, such as NAOH, or from other bases such as those included in the alkali metal and alkaline earth metal phosphates, bicarbonates, oxides and hydroxides. These components are often reacted by means of a mixture prepared initially from the aromatic dihydroxy compound, water and a non-reactive organic solvent immiscible with water selected from among those in which the carbonate precursor and polycarbonate product are soluble. Representative solvents include chlorinated hydrocarbons such as methylene chloride, 1,2-dichloroethane, tetrachloroethane, chlorobenzene, and chloroform, to which tetrahydrofuran, dioxane, nitrobenzene, dimethyl sulfoxide, xylene, cresol or anisole may be added, if desired. Caustic soda or other base is then added to the reaction mixture to adjust the pH of the mixture to a level at which the dihydroxy compound is activated to dianionic form. A reducing agent such as sodium sulfite or sodium dithionite can also be advantageously added to the reaction mixture as well.

A carbonate precursor is contacted with an agitated mixture of the aqueous alkaline solution of the dihydroxy compound, and, for such purpose, the carbonate precursor can be bubbled into the reaction mixture in the form of a gas, or can be dissolved and introduced in solution form. The mixture is agitated in a manner which is sufficient to disperse or suspend droplets of the solvent containing the carbonate precursor in the aqueous alkaline solution. Reaction at the interface of the organic and aqueous phases created by such agitation yields the bis(carbonate precursor) ester of the dihydroxy compound. For example, if the carbonate precursor is a carbonyl halide such as phosgene, the products of this initial phase of the process are monomers or oligomers which are either mono- or dichloroformates, or contain a phenolate ion at each terminus. These intermediate mono- and oligocarbonates dissolve in the organic solvent as they form, and they can then be condensed to a higher molecular weight polycarbonate by contact with a coupling catalyst of which the following are representative: a tertiary amine such as triethyl amine or dimethyl amino pyridine; a hindered secondary amine such as diisopropyl amine; a cyclic aza compound such as 2,2,6,6-tetramethyl piperidine or 1,2-dimethylimidazole; an amidine or aminoamidine compound such as 1-methyl-2-phenyliminopyrrolidine; an isourea compound such as N,N-dibutyl-N'-phenyl-o-methylisourea; an iminoether or iminocarboxylate compound such as 1-aza-2-methoxy-1-cycloheptene or t-butyl-cyclohexyliminoacetate; or a phosphonium, sulfonium, arsonium or quaternary ammonium compound. Such a catalyst may be added to the reaction mixture before or after it is contacted with a carbonate precursor.

The reaction can be run at a pH of 7.01 to 14, and at a temperature between 0° C.–100° C., although usually not in excess of the boiling point (reflux temperature) of the solvent used. Frequently, the reaction is run at a temperature of about 0° C. to about 45° C.

Upon completion of polymerization, the organic and aqueous phases are separated to allow purification of the organic phase and recovery of the polycarbonate product therefrom. The organic phase is washed as needed in a centrifuge with dilute base, water and/or dilute acid until free of unreacted monomer, residual process chemicals and/or other electrolytes. Recovery of the polycarbonate product can be effected by spray drying, steam devolatilization, direct devolatilization in a vented extruder, or precipitation by use of an anti-solvent such as toluene, cyclohexane, heptane, methanol, hexanol, or methyl ethyl ketone.

In the melt process for preparation of polycarbonate, aromatic diesters of carbonic acid are condensed with an aromatic dihydroxy compound in a transesterification reaction in the presence of a basic catalyst such as sodium methylate, sodium bisphenolate, calcium acetate, phenyl benzoate, N-stearoylphenothiazine, quaternary ammonium chloride, an alkaline(hydroxy)-fluoroborate, an alkali metal salt of benzoic acid, an iminocarboxylic acid, or basic metal oxides such as zinc, lead or antimony oxide. The reaction is typically run at 250° C.–300° C. under vacuum at a progressively reduced pressure of 1–100 mm Hg. The reaction is run in the absence of solvent and typically yields lower viscosity grades of polycarbonate.

Polycarbonate can also be prepared in a homogeneous solution through a process in which a carbonate precursor, such as phosgene, is contacted with a solution containing an aromatic dihydroxy compound, a chlorinated hydrocarbon solvent and a substance, such as pyridine, dimethyl aniline or CAOH, which acts as both acid acceptor and condensation catalyst. Washing with acidified water removes the pyridine and its hydrochloride, and precipitation and repulping with an antisolvent such as heptane followed by filtration and distillation removes oligomers and unreacted monomer.

Yet another process for the preparation of polycarbonate is the polymerization of cyclic oligomers having a weight average molecular weight of approximately 1,300 at 200° C.–300° C., using a catalyst such as lithium stearate or tetramethylammonium tetraphenylborate.

Examples of some dihydroxy compounds suitable for the preparation of polycarbonate include variously bridged, substituted or unsubstituted aromatic dihydroxy compounds (or mixtures thereof) represented by the formula

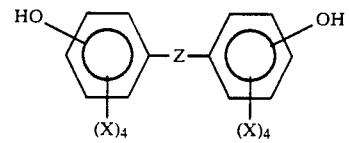

wherein:
  (I) Z is (A) a divalent radical, of which all or different portions can be (i) linear, branched, cyclic or bicyclic, (ii) aliphatic or aromatic, and/or (iii) unsaturated, said divalent radical being composed of 1–35 carbon atoms together with up to five oxygen, nitrogen, sulfur, phosphorous and/or halogen (such as fluorine, chlorine and/or bromine) atoms; or (B) S, $S_2$, SO, $SO_2$, O or CO; or (C) a single bond; and
  (II) each X is independently hydrogen, a halogen (such as flourine, chlorine and/or bromine), a $C_1$-$C_{12}$ linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy.

For example, the bridging radical represented by Z in the above formula can be a carbon atom to which is bonded one or more groups such as $CH_3$, $C_2H_5$, $C_3H_7$, n-$C_3H_7$, i-$C_3H_7$, cyclohexyl, bicyclo[2.2.1]heptyl, benzyl, $CF_2$, $CF_3$ $CCl_3$, $CF_2Cl$, CN, $(CH_2)_2COOCH_3$, or $PO(OCH_3)_2$.

Representative examples of dihydroxy compounds of particular interest are 2,2-bis(4-hydroxyphenyl)propane ("Bisphenol-A" or "Bis-A");

2,2-bis(3,5-dihalo-4-hydroxyphenyl)propane ("Tetrahalo Bisphenol-A") where the halogen can be fluorine, chlorine, bromine or iodine, for example 2,2-bis(3,5-dibromo-4-hydroxyphenyl)propane ("Tetrabromo Bisphenol-A" or "TBBA");

2,2-bis(3,5-dialkyl-4-hydroxyphenyl)propane ("Tetraalkyl Bisphenol-A") where the alkyl can be methyl or ethyl, for example 2,2-bis(3,5-dimethyl-4-hydroxyphenyl)propane ("Tetramethyl Bisphenol-A");

1,1-bis(4-hydroxyphenyl)-1-phenyl ethane ("Bisphenol-AP" or "Bis-AP");

Bishydroxy phenyl fluorene.

Using a process such as is generally described above, a polycarbonate product can be obtained having a weight average molecular weight, as determined by light scattering or gel permeation chromatography, of 8,000 to 200,000 and preferably 15,000 to 40,000, although values outside these ranges are permitted as well. Molecular weight can be controlled by addition to the reaction mixture of a chain terminator which may be selected from monofunctional substances such as phenols, alcohols, amines, imides, carbonic acid chlorides, sulfonic acid chlorides, benzyltriethyl ammonium chloride, or phenylchlorocarbonates. A chain terminator may be added to the reaction mixture before or after a dihydroxy compound is contacted with a carbonate precursor.

A branched rather than linear polycarbonate molecule can be obtained by adding to the reaction mixture a tri- or polyfunctional monomer such as a tri- or tetrafunctional phenol or carboxylic acid (or a derivative such as an acyl halide or anhydride), a bisphenol containing carboxylic acid side groups, or a nitrogen-containing compound such as cyanuric chloride, or compounds containing a mixture of such groups. Preferred branching agents are trimellitic acid or pyromellitic dianhydride.

The preferred process of this invention is that in which an aromatic polycarbonate is prepared. An aromatic polycarbonate is defined herein with reference to the oxygen atoms, of the one or more dihydroxy compounds present in the polycarbonate chain, which are bonded to a carbonyl carbon. In an aromatic polycarbonate, all such oxygen atoms are bridged by a dihydroxy compound residue some portion of which is an aromatic ring.

Also included within the term "polycarbonate", as used herein, are various copolycarbonates, certain of which can be prepared by incorporating one or more different dihydroxy compounds into the reaction mixture. This can be accomplished by charging the dihydroxy compounds themselves to the reaction mixture either simultaneously or sequentially. If the dihydroxy compounds are added sequentially or added together but have different reactivities toward the carbonate precursor, a segmented or block copolycarbonate will typically result. Different dihydroxy compounds with the same reactivity typically yield a random copolycarbonate when reacted together. Alternatively, if oligocarbonates are formed separately from one or more different dihydroxy compounds, the oligocarbonates can then be coupled in a condensation reaction to yield a segmented or block copolycarbonate. When a dicarboxylic acid (or derivative) or a hydroxycarboxylic acid is used in the reaction -mixture, or to form an oligomeric prepolymer, instead of one of the different dihydroxy compounds mentioned above, a poly(ester/carbonate) is obtained.

Copolycarbonates can also be prepared, for example, by reaction of one or more dihydroxy compounds with a carbonate precursor in the presence of a chlorine- or amino-terminated polysiloxane, with a hydroxy-terminated poly(phenylene oxide) or poly(methyl methacrylate), or with phosphonyl dichloride or an aromatic ester of a phosphonic acid. Siloxane/carbonate block copolymers are discussed in greater detail in Paul, U.S. Pat. No. 4,596,970 and poly(ester/carbonate)s are discussed in greater detail in Swart, U.S. Pat. No. 4,105,533, each of which is incorporated herein.

The methods generally described above for preparing carbonate polymers suitable for use in the practice of this invention are well known; for example, several methods are discussed in detail in Schnell, U.S. Pat. No. 3,028,365; Campbell, U.S. Pat. No. 4,384,108; Glass, U.S. Pat. No. 4,529,791; and Grigo, U.S. Pat. No. 4,677,162, each of which is incorporated as a part hereof.

Component (b)(iii) in the compositions of this invention is a halogenated aromatic carbonate oligomer, which may be made, in general, by the methods set forth above for the preparation of polycarbonate. As component (b)(iii) is halogenated, it may be prepared using, for example, an aromatic dihydroxy compound as described by structure above wherein at least one X is halogen; as it is aromatic, the carbonyl carbons in its polymer chain are bridged by a dihydroxy compound residue some portion of which is an aromatic ring; and as it is an oligomer, it has a degree of polymerization of about 2 to about 30. Representative examples of a suitable halogenated aromatic carbonate oligomer is a carbonate oligomer prepared from Tetrabromo Bisphenol-A, which is available from Great Lakes Chemicals as BC-52 or BC-58.

Component (a)(ii) in the compositions of this invention is a polyester, which may be made by the self-esterification of hydroxycarboxylic acids, or direct esterification, which involves the reaction of a diol with a dicarboxylic acid with the resulting elimination of water, giving an -[-AABB-]- polyester. Temperatures applied exceed the melting points of the reactants and typically approach the boiling point of the diol being used, and usually range from about 150° C. to about 280° C. An excess of the diol is typically used, and once all of the acid has reacted with diol, the excess diol is removed by distillation with the application of additional heat under reduced pressure.

Alternatively, but in like manner, ester-forming derivatives of a dicarboxylic acid can be heated with a diol to obtain polyesters in an ester interchange reaction. Suitable acid derivatives for such purpose are esters, halides, salts or anhydrides of the acid. The ester interchange reaction is typically run in the presence of a diluent, for example, an inert organic solvent such as chloroform or tetrachloroethane, and in the presence of a base, for example a tertiary organic base such as pyridine. Typical catalysts used when ester interchange involves alcoholysis are weak bases such as carbonates or alkoxides of sodium, lithium, zinc, calcium, magnesium or aluminum, whereas catalysts such as antimony oxide, titanium butoxide or sodium acetate are often Used when acidolysis occurs in the interchange reaction. Diol derivatives such as an acetate can be used effectively when it is desired to conduct acidolysis.

The molecular weight of polyester can be increased by adding a chain coupling agent, such as diphenyl carbonate, to the melt reaction mixture just prior its completion. Or, to achieve higher weight by solid state polymerization, polyester product of intermediate weight can be heated in a vacuum or stream of inert gas, first to a temperature where it crystallizes and then to a temperature close to its melting point.

Polyesters can also be produced by a ring-opening reaction of cyclic esters or lactones, for which organic tertiary bases and alkali and alkaline earth metals, hydrides and alkoxides can be used as initiators.

Whether a polyester is crystalline or amorphous is typically a function of the symmetry of the starting materials from which it is made. When one or more hydrogens on the diol and/or the diacid (or derivative) which are reacted to form a polyester are replaced by larger radicals such as alkyl or halogen, the intermolecular spacing of the resulting molecules may be disrupted if the presence of the substituent creates asymmetric or irregularly shaped molecules. The component containing the substituent may also be combined into the polyester molecule in random orientation, resulting in structural irregularity in the polymer chain. Factors which can influence crystallization of ring-containing polyesters are the directionality of the ester groups, the stereochemistry of the rings and variations in symmetry where the rings are bridged. For example, a poly(alkylene isophthalate) crystallizes only with difficulty, and a polyester prepared from phthalic acid typically does not crystallize at all. However, where the amount of monomer containing the asymmetry is small in relation to the remainder of the starting materials, the portion of the resulting polyester molecule which suffers from structural irregularity will also be small, and crystallization will typically not be impeded. A crystalline material may be identified by the endotherm it displays on a differential scanning calorimeter. A preferred polyester for use in this invention is a crystalline polyester having a melting point of 254°–260° C.

Suitable reactants for making the polyester used in this invention, in addition to hydroxycarboxylic acids, are diols and dicarboxylic acids either or both of which can be aliphatic or aromatic. A polyester which is a poly(alkylene alkanedicarboxylate), a poly(alkylene phenylenedicarboxylate), a poly(phenylene alkanedicarboxylate), or a poly(phenylene phenylenedicarboxylate) is therefore appropriate for use herein. Alkyl portions of the polymer chain can be substituted with, for example, halogens, alkoxy groups or alkyl side chains and can contain divalent heteroatomic groups (such as $-O-$, $-S-$ or $-SO_2-$) in the paraffinic segment of the chain. The chain can also contain unsaturation and non-aromatic rings. Aromatic rings can contain substituents such as halogens, alkoxy or alkyl groups, and can be joined to the polymer backbone in any ring position and directly to the alcohol or acid functionality or to intervening atoms.

Typical alkylene diols used in ester formation are the $C_2$–$C_{10}$ glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexanedimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention, and are all included in the term "polyester". For example, use of cyclohexanedimethylol together with ethylene glycol in esterification with terephthalic acid forms a clear, amorphous copolyester ("PETG") of particular interest. Also contemplated are PCTG; liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl.

Aromatic polyesters, those prepared from an aromatic diacid, such as the poly(alkylene phenylenedicarboxylates) polyethylene terephthalate and polybutylene terephthalate, or mixtures thereof, are particularly useful in this invention.

Methods and materials useful for the production of polyesters, as described above, are discussed in greater detail in Whinfield, U.S. Pat. No. 2,465,319, Pengilly, U.S. Pat. No. 3,047,539 and Russell, U.S. Pat. No. 3,756,986, each of which is incorporated herein by reference.

Component (a)(iii) in the compositions of this invention is an acrylate polymer, which is defined as a polymer prepared by homopolymerization of an alkyl acrylate or an alkyl methacrylate or by copolymerization of a mixture of the two; and includes a mixture of any such homopolymers or copolymers.

An alkyl acrylate or methacrylate can be prepared, for example, by reaction of an alkyl alcohol or diazoalkane with acrylic or methacrylic acid. Acrylic acid is prepared by the vapor phase oxidation of propylene. The acrylic acid/alcohol esterification reaction can be run at about 80° C. using an acid catalyst such as $H_2SO_4$. Methacrylic acid may be prepared by the oxidation of isobutylene or t-butyl alcohol. A methacrylate may also be prepared by reacting acetone cyanohydrin with an excess of concentrated sulfuric acid to form methacrylamide sulfate, which, when then reacted with an alcohol, yields a methacrylate. A $C_1$–$C_{10}$ acrylate or methacrylate may be used for polymer preparation herein, with $C_1$–$C_6$ acrylate or methacrylate being preferred, and $C_1$–$C_4$ being more preferred.

The acrylate polymer used in the compositions of this invention can be prepared in a polymerization reaction initiated by free radical initiators such as azo compounds or peroxides, preferably in the absence of oxygen. Methacrylate monomers are most often polymerized in bulk, but this method has little application for acrylate monomers. Acrylate and methacrylate monomers may be polymerized in an organic solution, using, for example, an aromatic hydrocarbon, ester, ketone or chlorohydrocarbon (such as toluene, chlorobenzene or 3-pentanone) as the solvent. A chain transfer agent such as a thiol may be used to control molecular weight. Polymerization can also occur in an aqueous emulsion in which an anionic surfactant, such as an alkylarene sulfate or phosphate, a nonionic surfactant, such as an alkyl or aryl polyoxyethylene, or a cationic surfactant is used. Suspension polymerization is used primarily for methacrylates and involves suspending in water 0.1-5 mm droplets of monomer which are stabilized by a protective colloid such as cellulose, poly(vinyl alcohol), gelatin or tale. The initiator should be soluble in the monomer but not in water. Acrylates and methacrylates can also be polymerized in a non-aqueous dispersion using an organic diluent such as hexane or methanol.

When an acrylate and a methacrylate are copolymerized, the acrylate, each can be used in the mix of reactants from which the copolymer results in an amount of up to about 99.0 parts by weight, based on the total weight of the copolymer. When the acrylate polymer of component (b) (i) takes the form of a copolymer, the copolymer may be a random, alternate, block or grafted copolymer.

Component (b)(i) in the compositions of this invention is an organophosphorous compound, which is employed to increase ignition resistance. Suitable organophosphorous compounds are those which include the organophosphates, the organophosphonites, the organophosphines, the organophosphites and the polyphosphates. Preferred organophosphorus compounds are those containing repeating groups represented by the formulae:

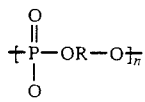

(I) or mixtures of

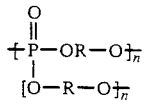

and (I) or those represented by the formulae:

O=P(OR)$_3$,

R—P—(OR)—OR,

RO—P(OR)—R$^1$—P(OR)—OR,

R—P(R)—OR,

P(R)$_3$, and

P(OR)$_3$ wherein each R is independently a linear or cyclic, substituted or unsubstituted aryl, alkyl, aralkyl, or alkaryl radical containing one to twenty carbon atoms, including halogenated alkyl or aryl radicals, such as methyl, ethyl, isopropyl, cyclopentyl, cyclohexyl, benzyl, tolyl, and/or xylyl; R$^1$ is a 4,4'biphenyl radical; and n is an integer from 1 to 1,000. The preferred organophosphorous compound is a phosphorous acid ester such as triphenylphosphate. Suitable organophosphorus compositions are disclosed, for example, in U.S. Pat. Nos. 4,066,611; 4,073,769; 4,076,686; 4,088,709; 4,427,813; and 4,254,014, each of which is incorporated herein.

Component (b)(ii) in the compositions of this invention is fibril-forming poly(tetrafluoroethylene) ("PTFE"). PTFE can be made by the granular polymerization process wherein tetrafluoroethylene ("TFE") is pressured into an agitated aqueous solution of free radical initiator at pressures of 5-80 kg/cm$^2$ and at temperatures of 50°-150° C. Initiators can be redox systems, azo initiators, peroxides or inorganic persulfates. The polymer particles coagulate as they are formed. Fine-powder PTFE can be made by a process similar to the foregoing except that sufficient dispersing agent is used to maintain a stable dispersion throughout polymerization and avoid premature coagulation. The dispersing agent is anionic and substantially non-telogenic, such as a fluorinated carboxylate containing 7-20 carbons. TFE is prepared by reacting hydrogen fluoride and chloroform to give chlorodifluoromethane, which is then pyrolyzed in a noncatalytic gas-phase reaction at atmospheric or reduced pressure, usually at about 590°-900° C., to obtain tetrafluoroethylene. The processes for making PTFE described above are discussed in greater detail in U.S. Pat. Nos. 2,393,967, 3,855,191 and 4,186,121, each of which is incorporated herein.

Fibril-forming PTFE is typically considered to be that which has a structure wherein PTFE particles having an average size of 0.1-0.2 microns are held together by fibrils having diameters from a fourth to a tenth or less of the diameters of the particles. PTFE which loses or does not form such structure, as a result of mechanical shearing, is typically considered to be non-fibril-forming. Fibril-forming PTFE is disclosed, in general, by U.S. Pat. Nos. 3,005,795, 3,671,487 and 4,463,130, each of which is incorporated herein. Most desirably, the PTFE employed in the compositions of this invention has a high elastic memory such that, when incorporated into the polymeric blend and molded into a molded object, such molded object will have a heat shrinkage equal to or greater than 15 percent when tested, for example, at a level of 0.5 weight percent in a composition of this invention in an injection-molded bar measuring 127 mm×27 mm×1.6 mm which is heated at 160° C. for 1 hour. Representative examples of PTFE which have high elastic memory are various members of the Teflon TM PTFE series available from E. I. du Pont de Nemours & Co., to-wit: 6C, 6CN, 60, 64, 65 and 67.

Component (c) in the compositions of this invention is an elastomeric impact modifier, several different varieties of which, or a mixture thereof, are suitable for use herein. One form which such elastomeric impact modifier may take is a block copolymer which can be either linear, branched, radial or teleblock, and can be either a di-block ("A-B") copolymer, tri-block ("A-B-A") copolymer, or radial teleblock copolymer with or without tapered sections, i.e. portions of the polymer where the monomers alternate or are in random order close to the point of transition between the A and B blocks. The A portion is made by polymerizing one or more vinyl aromatic hydrocarbon monomers, and has an average molecular weight of about 4,000 to about 115,000, and a weight preferably of about 8,000 to about 60,000. The B portion of the block copolymer results from polymerizing a diene and has a molecular weight of about 20,000 to about 450,000, and a weight preferably of about 50,000 to about 300,000. In the A-B di-block copolymer, each block, A or B, can vary from 10-90% of the total weight of the copolymer. In the A-B-A tri-block copolymer, the A end groups typically constitute about 2 wt % to about 55 wt % of the whole block copolymer, and preferably are between 5 wt % and 45 wt % of the whole block copolymer.

The A block of the block copolymer has properties characteristic of thermoplastic substances in that it has the stability necessary for processing at elevated temperatures and yet possesses good strength below the temperature at which it softens. The A block is polymerized predominantly from vinyl aromatic hydrocarbons, and substituted derivatives thereof wherein the aromatic moiety can be either mono- or polycyclic. Monomers from which the thermoplastic end blocks can be formed are, for example, styrene and substituted derivatives thereof such as $\alpha$-methyl styrene, vinyl xylene, vinyl naphthalene, and the like, and mixtures of two or more thereof. Other vinyl monomers such as methyl acrylate, methyl methacrylate, phenyl maleimide, acrylonitrile or vinyl pyridine may be used in the formation of the A block together with the aromatic monomers. The polymerization can be initiated by lithium metal, or alkyl- or aryl lithium compounds such as butyl lithium or isoamyl lithium. Polymerization is normally conducted at temperatures ranging from about $-20°$ C. to about 100° C.

The B block of the copolymer can be formed, for example, simply by injecting suitable monomer into the reaction vessel and displacing the lithium radical from the just-polymerized A block, which then acts as an initiator because it is still charged. The B block is formed predominantly from substituted or unsubstituted $C_2-C_{10}$ dienes, particularly conjugated dienes such as butadiene or isoprene. Other diene, vinyl or olefinic monomers such as chloroprene, 1,4-pentadiene, isobutylene, ethylene or vinyl chloride may be used in the formation of the B block provided that they are present at a level low enough to not alter the fundamental olefinic character of the B block. The B block will be characterized by elastomeric properties which allow it to to absorb and dissipate an applied stress and then regain its shape.

In the A-B-A tri-block copolymer, the second end block A can be formed in a manner similar to the first, by injecting appropriate vinyl aromatic monomer into the reaction vessel. Alternatively, a bivalent lithium initiator can be used, which, when brought together with the diene monomer under the same conditions described above, will form an elastomeric mid block B which carries a charge at each end. Then, upon addition of vinyl aromatic monomer to the reaction mixture, a thermoplastic end block A will form on both ends of the mid block B, yielding a thermoplastic elastomeric A-B-A copolymer.

To reduce oxidative and thermal instability, the block copolymers used herein can also desirably be hydrogenated to reduce the degree of unsaturation on the polymer chain and on the pendant aromatic rings. The block copolymer may be selectively hydrogenated by hydrogenating only the elastomeric block B. Typical hydrogenation catalysts utilized are Raney nickel, molybdenum sulfide, finely divided palladium and platinum oxide. The hydrogenation reaction is typically run at 75°-450° F. and at 100-1,000 psig for 10-25 hours.

The most preferred vinyl aromatic block copolymers are vinyl aromatic/conjugated diene block copolymers formed from styrene and butadiene or styrene and isoprene. When the styrene/butadiene copolymers are hydrogenated, they are frequently represented as styrene/(ethylene/butylene) copolymer in the di-block form, or as styrene/(ethylene/butylene)/styrene copolymer in the tri-block form. When the styrene/isoprene copolymers are hydrogenated, they are frequently represented as styrene/(ethylene/propylene) copolymer in the di-block form, or as styrene/(ethylene/propylene)/styrene copolymer in the tri-block form. The vinyl aromatic/diene block copolymers described above are discussed in greater detail in Holden, U.S. Pat. No. 3,265,766; Haefele, U.S. Pat. No. 3,333,024; Wald, U.S. Pat. No. 3,595,942; and Witsiepe, U.S. Pat. No. 3,651,014, each of which is incorporated herein.

Other elastomeric impact modifiers useful in the compositions of this invention are thermoplastic elastomers, emulsion-type, core-shell graft copolymer elastomers, and olefinic elastomers.

Thermoplastic elastomers are those which are characterized, for example, in that they can be melted and recooled, or dissolved and reformed upon removal of the solvent, without undergoing any significant change in properties. Thermoplastic elastomers are also characterized by the randomness of the shape and size they take on when mixed by shearing forces with the other components making up the compositions of this invention, especially when heat is applied during such mixing. Because thermoplastic elastomer is typically a long chain molecule, segments of a thermoplastic elastomer in the polymer composition matrix are generally elongated, linear ribbons or bands. The molecules tend to fuse and flow together in a continuous structure. However, chain coiling can yield globule-shaped segments of thermoplastic elastomer in the matrix.

The random shape and size assumed in the polymer composition matrix by a thermoplastic elastomer is to be distinguished from the shape and size assumed by a core-shell graft copolymer. A core-shell graft copolymer is typically present in the polymer matrix in a bead shape both before and after mixing by application of shearing forces, whether heat is used or not, and is usually present in a rather narrow size range, for example 0.05-0.8 microns. The retention of this core-shell, or spherical, shape by the graft polymer, even after heating and mixing, results from the fact that the outer layers, which surround the core, are formed by grafting appropriate monomers onto the core. A core-shell graft copolymer typically cannot be melted and recooled without a significant change in properties because the graft polymer will tend to decompose or crosslink, and the bead-shaped segments of graft polymer will tend to agglomerate upon melting, making dispersion of them by mixing difficult.

Thermoplastic elastomers include, for example, an SBR rubber, which is a copolymer of styrene and butadiene typically containing about 23% styrene. The monomers themselves can be randomly dispersed along the backbone, or blocks of each monomer can be randomly dispersed. Thermoplastic elastomers also include the di-block ("A-B") copolymers and the tri-block ("A-B-A") copolymers discussed.

Linear, branched, radial or teleblock A-B-A or A-B block copolymer thermoplastic elastomers can also be prepared from materials other then vinyl aromatic systems. These other copolymers also have a rigid block "A" having a $T_g$ above room temperature (approximately 23°-25° C.) and a rubbery block "B" having a $T_g$ below room temperature. Examples of typical pairings of the various materials used to form the respective A and B blocks of such other block copolymer thermoplastic elastomers are shown below in Table I.

TABLE I

| Block Copolymer Pairings | |
|---|---|
| A block | B block |
| polyethylene | ethylene/butylene copolymer |
| polyurethane | polyester polyether |
| polyester | polyether |
| polypropylene | EPDM rubber |

Block copolymer thermoplastic elastomers can be prepared, for example, by anionic polymerization using an alkyl-lithium initiator. Thermoplastic elastomers based on urethane are discussed in greater detail in Schollenberger, U.S. Pat. No. 3,015,650 and Saunders, U.S. Pat. No. 3,214,411; and those based on copolyester-ether are discussed in Witsiepe, U.S. Pat. No. 3,651,014, each of which is incorporated herein.

Representative examples of the core-shell graft copolymer elastomers suitable for use herein are those which can be based on either a diene rubber, an acrylate rubber or on mixtures thereof.

A diene rubber contains a substrate latex, or core, which is made by polymerizing a diene, preferably a conjugated diene, or by copolymerizing a diene with a monoolefin or polar vinyl compound, such as styrene, acrylonitrile, or an alkyl ester of an unsaturated carboxylic acid such as methyl methacrylate. The substrate latex is typically made up of about 40-85% diene, preferably a conjugated diene, and about 15-60% of the monoolefin or polar vinyl compound. The elastomeric core phase should have a glass transition temperature ("$T_g$") of less than about 10° C., and preferably less than about −20° C. A mixture of ethylenically unsaturated monomers is then graft polymerized to the substrate latex. A variety of monomers may be used for this grafting purpose, of which the following are exemplary: vinyl compounds such as vinyl toluene or vinyl chloride; vinyl aromatics such as styrene, alpha-methyl styrene or halogenated styrene; acrylonitrile, methacrylonitrile or alpha-halogenated acrylonitrile; a $C_1$-$C_8$ alkyl acrylate such as ethyl acrylate or hexyl acrylate; a $C_1$-$C_8$ alkyl methacrylate such as methyl methacrylate or hexyl methacrylate; glycidyl methacrylate; acrylic or methacrylic acid; and the like or a mixture of two or more thereof. The preferred grafting monomers include one or more of styrene, acrylonitrile and methyl methacrylate.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for methyl methacrylate/butadiene/styrene copolymer ("MBS" rubber) is about 60-80 parts by weight substrate latex, about 10-20 parts by weight of each of the first and second monomer shells. A preferred formulation for an MBS rubber is one having a core built up from about 71 parts of butadiene, about 3 parts of styrene, about 4 parts of methyl methacrylate and about 1 part of divinyl benzene; a second phase of about 11 parts of styrene; and a shell phase of about 11 parts of methyl methacrylate and about 0.1 part of 1,3-butylene glycol dimethacrylate, where the parts are by weight of the total composition. A diene-based, core-shell graft copolymer elastomer and methods for making same, as described above, are discussed in greater detail in Saito, U.S. Pat. No. 3,287,443, Curfman, U.S. Pat. No. 3,657,391, and Fromuth, U.S. Pat. No. 4,180,494.

An acrylate rubber has a first phase forming an elastomeric core and a second phase forming a rigid thermoplastic phase about said elastomeric core. The elastomeric core is formed by emulsion or suspension polymerization of monomers which consist of at least about 50 weight percent alkyl and/or aralkyl acrylates having up to fifteen carbon atoms, and, although longer chains may be used, the alkyls are preferably $C_2$-$C_6$, most preferably butyl acrylate. The elastomeric core phase should have a $T_g$ of less than about 10° C., and preferably less than about −20° C.

The rigid thermoplastic phase of the acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Ethylenically unsaturated monomers such as glycidyl methacrylate, or an alkyl ester of an unsaturated carboxylic acid, for example a $C_1$-$C_8$ alkyl acrylate like methyl acrylate, hydroxy ethyl acrylate or hexyl acrylate, or a $C_1$-$C_8$ alkyl methacrylate such as methyl methacrylate or hexyl methacrylate, or mixtures of any of the foregoing, are some of the vinyl monomers which can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least about 20% bonding of the rigid thermoplastic phase to the elastomeric core.

A preferred acrylate rubber is made up of more than about 40% to about 95% by weight of an elastomeric core and about 60% to about 5% of a rigid thermoplastic phase. The elastomeric core can be polymerized from about 75% to about 99.8% by weight $C_1$-$C_6$ acrylate, preferably n-butyl acrylate. The rigid thermoplastic phase can be polymerized from at least 50% by weight of $C_1$-$C_8$alkyl methacrylate, preferably methyl methacrylate. Acrylate rubbers and methods for making same, as described above, are discussed in greater detail in Owens, U.S. Pat. No. 3,808,180 and Witman, U.S. Pat. No. 4,299,928.

Olefinic elastomers useful as an impact modifier in the compositions of this invention are based generally on a long-chain, hydrocarbon backbone, which may or may not be grafted with one or more vinyl monomers. Representative examples of a few olefinic elastomers which illustrate the variation in the known substances which would suffice for such purpose are as follows: butyl rubber; chlorinated polyethylene rubber; chlorosulfonated polyethylene rubber; ethylene/propylene copolymer and ethylene/propylene/diene copolymer, which may be grafted with one or more vinyl monomers;

neoprene rubber; nitrile rubber; polybutadiene and polyisoprene.

A variety of additives may be used in the compositions of this invention for protection against thermal, oxidative and ultra-violet degradation. Representative of the thermal and oxidative stabilizers which can be advantageously utilized are hindered phenols, hydroquinones, phosphites, including substituted members of those groups and/or mixtures of more than one thereof. A preferred phenolic anti-oxidant is Irganox TM 1076 anti-oxidant, available from Ciba-Geigy Corp. Ultraviolet stabilizers such as various substituted resorcinols, salicylates, benzotriazoles, benzophines, hindered amines and hindered phenols can also be usefully included in the compositions hereof, as can be lubricants, colorants, fillers such as talc, clay, phosphate, metal, inorganic or graphite fibers, or mica, dyes, pigments, mold release agents, and reinforcement agents such as fiberglass or phosphate, metal, inorganic or graphite fibers. Additives and stabilizers of the same or a similar kind as the foregoing are known, and the use and selection thereof is within the skill in the art. However, such additives, if used, typically do not exceed 15 percent by weight of the total composition, except fillers or reinforcing agents, which may constitute up to 40 percent of the composition. Ignition resistant metal salts may be added, however, their presence, therefore, may not be desirable in the compositions of this invention.

To illustrate the practice of this invention, examples of several preferred embodiments are set forth below. It is not intended, however, that these examples (Examples 1 and 2) should in any manner restrict the scope of this invention. Some of the particularly desirable features of this invention may be seen by contrasting the characteristics of Examples 1 and 2 with those of various controlled formulations (Control A-G) which do not possess the features of, and are not therefore embodiments of, this invention.

The polycarbonate compositions prepared in Controls A-G and Examples 1 and 2 are made by dry blending the ingredients thereof in a Lightnin blender. The dry blended formulations are then melt mixed in a vented 30 mm Werner-Pfleiderer co-rotating, twin screw extruder using a set temperature of 270° C. for all barrel zones. Each extruded composition is passed through a water bath, chopped into granules and collected for molding. Granules are thoroughly dried in a circulated air oven at 100° C. for at least 4 hours prior to molding. All testing samples are prepared by injection molding on a 55 ton Negri Bossi molding machine, using a 250° C. temperature for the barrel.

The formulations of the polycarbonate compositions of Controls A-G and Examples 1 and 2 are given below in Table II, in parts by weight of the total composition. In Tables II and III:

"Polycarbonate" is a polycarbonate having a melt flow rate of 14, as determined according to ASTM Designation D 1238-89, Condition 300/1.2, available from The Dow Chemical Company;

"Polyester" is Tratuf TM 9506 poly(ethylene terephthalate) having an 0.95 intrinsic viscosity, available from Goodyear Tire and Rubber Company;

"Paraloid TM 8967" elastomeric copolymer is a methacrylate/butadiene/styrene core-shell elastomer, available from Rohm & Haas Company;

"Oligocarbonate" is Tetrabromo Bisphenol-A carbonate oligomer, available from Great Lakes Chemical, Inc.;

"Phosphate" is triphenyl phosphate, available from Akzo Chemicals, Inc.;

"PTFE" is Teflon TM 6C polymer, fibril-forming poly(tetrafluoroethylene), available from E. I. du Pont de Nemours & Co.;

"Quatrex ® 6410" resin, is a brominated epoxy novolac oligomer, available from The Dow Chemical Company; and "IR 1076" is phenolic anti-oxidant stabilizer, available from Ciba-Geigy Corporation.

The U.L. (Underwriters Laboratory) 94 burn test is performed on the samples which are ⅛ and 1/16 inch in thickness. A burner is placed under each sample until it ignites, and the time from ignition until burning ceases is measured. It is also noted whether burning causes the sample to drip. The test is repeated 5 times for each sample, the report below for Controls A-G and Examples 1 and 2 indicates whether the sample passed the U.L. 94 rating test.

Impact resistance is measured by the Izod test according to ASTM Designation D 256-84 (Method A) at 23° C. The notch is 10 mils (0.254 mm) in radius. Izod results are reported in ft-lb/in.

"H.D.T.U.L." is heat deflection temperature under load as measured in accordance with ASTM Designation D 648-82 at 66 psi.

The results of these tests are also reported in Table III.

In Tables II and III, Controls A-G are indicated by Ct-A, Ct-B etc., and Examples 1 and 2 are indicated by Ex-1, Ex-2 etc.

TABLE II

|  | Ct-A | Ct-B | Ct-C | Ct-D | Ct-E | Ct-F | Ct-G | Ex-1 | Ex-2 |
|---|---|---|---|---|---|---|---|---|---|
| Polycarbonate | 69.8 | 64.8 | 59.3 | 52.3 | 52.3 | 57.3 | 59.3 | 52.3 | 56.3 |
| Polyester | 30.0 | 30.0 | 30.0 | 30.0 | 30.0 | 30.0 | 30.0 | 30.0 | 30.0 |
| Paraloid TM 8967 |  | 5.0 | 5.0 | 7.0 | 7.0 | 5.0 | 5.0 | 7.0 | 5.0 |
| PTFE |  |  | 0.5 | 0.5 | 0.5 | 0.5 | 0.5 | 0.5 | 0.5 |
| Phosphate |  |  |  |  |  | 7.0 | 5.0 | 5.0 | 3.0 |
| Oligocarbonate |  |  | 5.0 | 10.0 |  |  |  | 5.0 | 5.0 |
| Quatrex TM 6410 |  |  |  |  | 10.0 |  |  |  |  |
| IR 1076 | 0.2 | 0.2 | 0.2 | 0.2 | 0.2 | 0.2 | 0.2 | 0.2 | 0.2 |

TABLE III

|  | Ct-A | Ct-B | Ct-C | Ct-D | Ct-E | Ct-F | Ct-G | Ex-1 | Ex-2 |
|---|---|---|---|---|---|---|---|---|---|
| Izod | 3.0 | 15.0 | 14 | 13 | 11 | 3 | 7 | 6 | 13 |
| H.D.T.U.L., °F. | 263 | 260 | 266 | 266 | 234 | 198 | 205 | 208 | 241 |
| U.L. 94, 1/8 inch | Fail | Fail | V-1 | V-0 | V-1 | V-0 | V-0 | V-0 | V-0 |

TABLE III-continued

|  | Ct-A | Ct-B | Ct-C | Ct-D | Ct-E | Ct-F | Ct-G | Ex-1 | Ex-2 |
|---|---|---|---|---|---|---|---|---|---|
| U.L. 94, 1/16 inch | Fail | Fail | Fail | Fail | Fail | V-0 | V-2 | V-0 | V-0 |

The results of the tests performed on the samples molded from the compositions of Controls A-G and Examples 1 and 2 demonstrate a unique combination of impact, heat and ignition resistance properites, especially in view of the low levels of ignition resistance additives present in these compositions.

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. A composition of matter comprising, in admixture, polycarbonate, polyester, a homopolymer of a $C_1$-$C_{10}$ alkyl acrylate or a $C_1$-$C_{10}$ alkyl methacrylate, fibril-forming poly(tetrafluoroethylene), an organophosphorous compound, and an aromatic halogenated carbonate oligomer, wherein the aromatic halogenated carbonate oligomer is present in an amount not exceeding 15 percent of the composition by weight, the organophosphorous compound is present in an amount not exceeding 5 percent of the composition by weight, and the poly(tetrafluoroethylene) is present in an amount not exceeding 5 percent of the composition by weight and said composition does not include an inorganic salt.

2. The composition of claim 1 further comprising an elastomeric impact modifier.

3. The composition of claim 1 wherein the aromatic halogenated carbonate oligomer is prepared from 2,2-bis(3,5-dibromo-4-hydroxyphenyl)propane.

4. The composition of claim 1 wherein the organophosphorous compound is a phosphorous acid ester.

5. The composition of claim 4 wherein the phosphorous acid ester is triphenyl phosphate.

6. The composition of claim 1 in the form of a molded object.

7. The molded object of claim 6 which is an electrical or electronic component.

8. The composition of claim 1 which as a V-O rating at a thickness of 1/16 inch as determined by the U.L. 94 burn test.

9. A composition of matter comprising, in admixture, polycarbonate, a homopolymer of a $C_1$-$C_{10}$ alkyl acrylate or a $C_1$-$C_{10}$ alkyl methacrylate, fibril-forming poly(tetrafluoroethylene), an organophosphorous compound, and an aromatic halogenated carbonate oligomer, wherein the aromatic halogenated carbonate oligomer is present in an amount not exceeding 15 percent of the composition by weight, the organophosphorous compound is present in an amount not exceeding 5 percent of the composition by weight, and the poly(tetrafluoroethylene) is present in an amount not exceeding 5 percent of the composition by weight and said composition does not include an inorganic salt.

10. The composition of claim 9 further comprising an elastomeric impact modifier.

11. The composition of claim 9 wherein the aromatic halogenated carbonate oligomer is prepared from 2,2-bis(3,5-dibromo-4-hydroxyphenyl)propane.

12. The composition of claim 9 wherein the organophosphorous compound is a phosphorous acid ester.

13. The composition of claim 12 wherein the phosphorous acid ester is triphenyl phosphate.

14. The composition of claim 9 in the form of a molded object.

15. The molded object of claim 14 which is an electrical or electronic component.

16. The composition of claim 9 which has a V-O rating at a thickness of 1/16 inch as determined by the U.L. 94 burn test.

* * * * *